Figure 1:
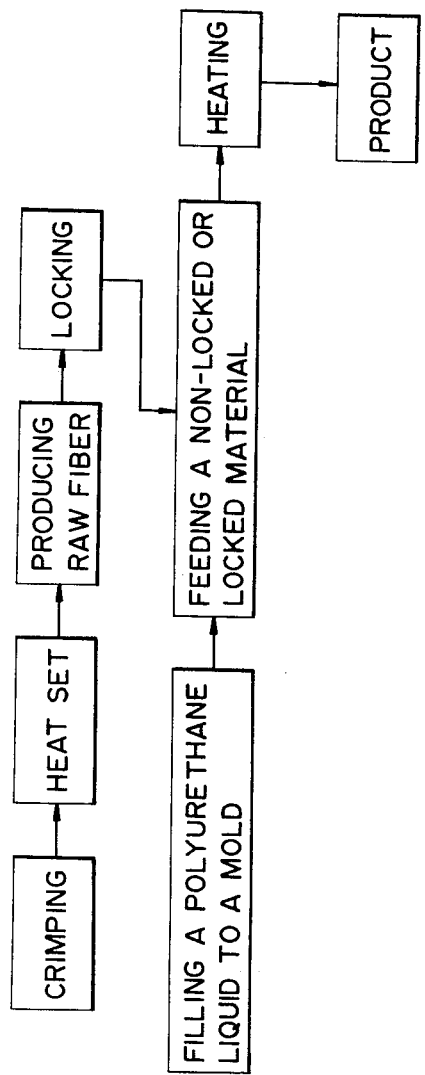

United States Patent [19]

Takagi

[11] 4,269,889
[45] May 26, 1981

[54] POLYURETHANE CUSHION MATERIAL AND PREPARING THE SAME

[76] Inventor: Sadaaki Takagi, 39, Mikage-cho, Okazaki-shi, Aichi-ken, Japan

[21] Appl. No.: 893,277

[22] Filed: Apr. 5, 1978

Related U.S. Application Data

[63] Continuation of Ser. No. 742,568, Nov. 17, 1976, abandoned.

[30] Foreign Application Priority Data

Nov. 18, 1975 [JP] Japan ............................... 50-138520

[51] Int. Cl.² ............................ B32B 3/26; B32B 5/20
[52] U.S. Cl. ................................... 428/315; 428/310; 428/362; 428/371; 428/401
[58] Field of Search ............... 57/2, 157 TS; 428/297, 428/304, 362, 369, 370, 371, 909, 310, 315, 401

[56] References Cited

U.S. PATENT DOCUMENTS

| | | | |
|---|---|---|---|
| 2,879,197 | 3/1959 | Muskat et al. | 428/305 |
| 3,383,273 | 5/1968 | Pearson et al. | 428/362 |
| 3,503,840 | 3/1970 | Parrish | 428/310 |
| 3,546,060 | 12/1970 | Hoppe et al. | 428/302 |
| 3,617,594 | 11/1971 | Willy | 428/317 |
| 3,663,352 | 5/1972 | Self et al. | 428/371 |
| 3,681,188 | 8/1972 | Harris | 428/371 |
| 3,811,922 | 5/1974 | Clark et al. | 428/310 |
| 4,118,531 | 10/1978 | Hauser | 428/297 |
| 4,159,617 | 7/1979 | Allan | 428/369 |

*Primary Examiner*—William J. Van Balen
*Attorney, Agent, or Firm*—Gordon W. Hueschen

[57] ABSTRACT

A polyurethane cushion material comprising incorporating a large denier of a fiber filament in a foamed polyurethane, and it is produced by crimping the fiber filament, setting it under heating, producing a staple fiber, filling the staple fiber thus formed with a polyurethane into a mold, forming the polyurethane and post-curing it to complete polycondensation.

6 Claims, 7 Drawing Figures

FIG. 2
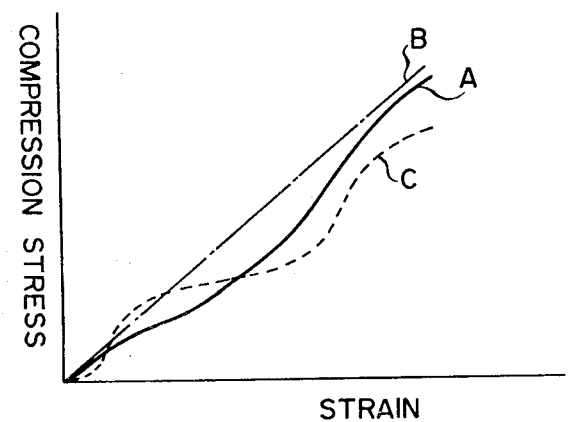
FIG. 3     FIG. 4
 
FIG. 5     FIG. 6     FIG. 7
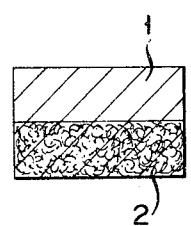 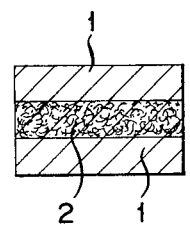 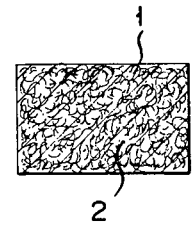

POLYURETHANE CUSHION MATERIAL AND PREPARING THE SAME

This is a continuation of application Ser No. 742,568, filed Nov. 17, 1976, now abandoned.

The present invention relates to a polyurethane cushion material and preparing the same, more particularly, it relates to a polyurethane cushion material comprising incorporating a large denier of a fiber filament in a foamed polyurethane and a method for preparing the same.

A polyurethane cushion material is widely used as a cushion material for beds, sheet of vehicles such as cars and trains, chairs, sofaes and the like, so its demand is very large.

In the past, the polyurethane cushion material has some defects that it is had in rigidity which corresponds to a shape stability of the cushion material, it has low repulsive elasticity and it cannot return to an original shape by permanent strain when it is used for a long period of time. Thus, it has not been obtained a sufficient cushion effect and it has not been used for a long period of time. In order to improve such defects, a spring and the like have been used sometimes as an auxiliary, they have been limited in respect of the spot to be used and the preparation, so they could not exhibit their effects sufficiently. Further the above mentioned problems have not hitherto been described, even if any fillers are incorporated into the polyurethane cushion material.

Accordingly, an object of the present invention is to provide an improved polyurethane cushion material.

An another object of the present invention is to provide a polyurethane cushion material having good rigidity, large repulsive elasticity and good cushion effect.

Further object of the present invention is to provide a polyurethane cushion material which does not yield permanent set, when it is used for a long period of time.

These objects can be attained by a polyurethane cushion material comprising incorporating a large denier of a fiber filament in a foamed polyurethane. The polyurethane cushion material can be produced by crimping a large denier of a fiber filament, setting it under heating, producing a staple fiber, if necessary locking or needle punching it, filling the staple fiber thus formed with a polyurethane, foaming the polyurethane and post-curing it to complete polycondensation.

I have studied on the improvement of rigidity and repulsive elasticity of the polyurethane cushion material and have found that superior effects can be obtained by incorporating a large denier of a fiber filament in a foamed polyurethane. A typical fiber is a synthetic fiber such as polyester, polyamide, polyacrylonitrile, polypropylene, polyvinylidene chloride, vinylon and a natural fiber, preferably synthetic fiber, most preferably polyester fiber. That is to say, the polyester filament is better in rigidity and larger in repulsive elasticity than other synthetic fiber, and has good adhesiveness with polyurethane, further has good workability for filling the filament into the polyurethane if it is a locked or needle punch material and can be filled uniformly. The filament used in the present invention is 50 to 1,000 denier, preferably 100 to 600 denier.

The present invention will be understood best in connection with the accompanying drawings wherein;

FIG. 1 is a basic block diagram of the process for preparation of a polyurethane cushion material in accordance with the present invention, FIG. 2 is a graph showing a relation between compression stress and strain of a cushion material, FIG. 3 is a partial perspective view of a crimped filament, FIG. 4 is a front view of a three oriented filament, and FIGS. 5 to 7 are cross sectional views of the polyurethane cushion material in accordance with the present invention.

A process for the production of the polyurethane cushion material in accordance with the present invention is explained based on FIG. 1 by exemplifying polyethylene terephthalate (hereinafter referred to "polyester") as the fiber filament as follows:

Firstly 50 to 1,000 denier of polyester filament is crimped and set under heating, produced a staple fiber, then shaped into a mass capable of being filling the below mentioned mold, or further applied lock treating with an adhesive or needle punched to obtain two-oriented or three-oriented non-locked or locked material. There are various methods for crimping the filament, and three-oriented ones may be produced, for example, by means of the method and device disclosed in Japanese Utility Model Publication No. 40402/74. Heat setting may be carried out at a temperature of 90° to 150° C. by wet heating or 150° to 170° C. by dry heating, preferably 95° to 120° C. by wet heating for 1 to 5 minutes, preferably 1.5 to 3 minutes. Although both two-oriented and three-oriented materials may be used as the non-locked or locked material, three oriented one gives preferable result in respect of rigidity.

Then a small amount of polyurethane liquid is fed into a mold for foaming molding by hand-mixing, pouring or continuous method, readily filling the non-locked or locked material into it and subjecting to foaming under normal pressure at a temperature of 30° to 50° C., preferably 40° to 45° C. The amount of fed polyurethane liquid is preferably about 3 to about 10 g, especially about 4 to about 6 g per 100 ml of total volume of the mold. Then the foamed polyurethane is subjected to post-curing to complete polycondensation. The post-curing may be carried out a temperature of 150° to 200° C., preferably 180° to 200° C. for 10 to 30 minutes, preferably 20 to 30 minutes in case of a hot cure type and 50° to 90° C., preferably about 80° C. for 5 to 15 minutes, preferably about 10 minutes in case of a cold cure type. The resulting foamed material is removed from the mold to obtain polyurethane cushion material.

The polyurethane used in the present invention may be any conventional ones capable of forming a foamed material obtained by reaction of a polyhydroxy compound such as a polyester, a polyether and the like with an isocyanate. Foaming method may be one-shot method or pre-polymer method. Thus either one liquid type or two liquid type may be used. Typical polyester for preparing the polyurethane are Desmophen 2200, Multon R-68, Daltocel SF, Fomrez 50, Desmophen 2100, etc. Typical polyether are Desmophen 3300, 3400, 3500, 3600, 3700 and 3800, Caradol 5001, 4000 and 3000, Propylan 3, 4 and 305, Niax Triol LG 56, LM 52 and LF 70, Niax Diol and PPG 2025, Voranol P 2000, CP 3000, CP 4000, CP 5000, CP 3001 and CP 3500, Pluracol TP 4040 and TPE 4542, etc. Typical isocyanate are 2,4-tolylenediisocyanate (T-100), 65/35 tolylene diisocyanate (T-65), 80/20 tolylenediisocyanated (T-80), Mondur TD, Desmodur T-80, etc.

The non-locked or locked material may be used in an amount of generally 10 to 50% by weight, preferably 15 to 40% by weight, most preferably 20 to 30% by weight to the total weight of the cushion material. And the polyurethane is foamed so that the density of the foamed polyurethane becomes 0.01 to 0.05 g/cm$^3$, preferably 0.03 to 0.04 g/cm$^3$. Further hot cure type is preferable as the polyurethane to be used.

The polyurethane cushion material obtained in accordance with the present invention shows an approximately proportional curved line in compression stress and strain as shown by a curved line A in FIG. 2 and is similar to an ideal straight line B, so it has good rigidity. On the contrary, a conventional one forms a horizontal part in between as shown by a curved line C and has bad rigidity. Further the cushion material in accordance with the present invention increased considerably in repulsive elasticity. While the conventional foamed polyurethane yielded permanent set and became bad in rigidity when it is used for a long period of time, the polyurethane cushion material in accordance with the present invention does not yield permanent set at all and shows little change in rigidity.

As mentioned above, according to the present invention a polyurethane cushion material having good rigidity, large repulsive elasticity and good cushion property can be obtained, and the polyurethane cushion material which does not decrease rigidity and does not yield permanent set when it is used for a long period of time can be obtained.

The present invention is exemplified in more detail by the following Examples. Size of the specimens used in the test of physical properties in the following Examples is 200 mm×200 mm×100 mm. Results of the tests are summarized in TABLE 1, wherein I.L.D. 25% is a stress (kg) which is obtained by compressing the above mentioned specimen with a disc having 150 mm of diameter from the upper face under 10 mm/sec of compression speed, stopped the compression when it is compressed in 25% and measuring after 20 second, and I.L.D. 65% is a stress (kg) when it is similarly compressed in 65%. That is to say, I.L.D. shows a strength of a repulsive elasticity and $$\text{sag-factor} = \frac{I.L.D.\ 65\%}{I.L.D.\ 25\%}$$

shows a degree of rigidity. Generally sag-factor is preferably nearly to I.L.D. 65%/I.L.D. 25%=2.6.

Further, values (%) of repeated compression permanent strain is obtained by measuring thickness of the specimen, holding between two pararel plate, compressing it in 50% of the thickness of the specimen repeatedly for continuous 80,000 times under 60 times/min. of speed, removing the specimen, measuring the thickness of the specimens after 30 minutes and calculating by the following equation. There are holes having 6.3 mm of diameter at a distance of 20 mm in the lower plate of the parallel plates for compression.

Repeated compression permanent
strain=$(t_0 - t/t_0) \times 100$ (%)

wherein $t_0$ is a thickness of specimen before test and t is a thickness of specimen after test.

Further, less than 3% of repeated compression permanent strain is required for a seat for an automobile.

EXAMPLE 1

Ten to twenty cones (one cone consisted of about 100 to 120 of 300 denier of polyester filament, total denier was 300,000 to 700,000 denier.) were crimped by twisting them into a strand and further twisting the strand in the same direction to yield double crimped state as shown in FIG. 3. Then they were heat set by wet heating at a temperature of 110° C. for 2 minutes. Then the double crimped strand was loosened and the strand was cut into lengths of about 3 inches (76 mm) and the strand thus cut was opened by an opener to obtain a three-oriented filament as shown in FIG. 4. These filaments were shaped to a mass having desired shape and size by spraying polyacrylonitrile adhesive (Plymal E 934, sold by Sanyo Boeki Kabushiki Kaisha) onto it to obtain a locked material. Two liquid type polyurethane monomer comprising TDI 80 (34.7 g), G-300 (140 g), DABCO (0.2 g), T-9 (0.3 g), L 540 92.0 g), R-11 (10 g) and water (3.5 g) sold by Mitsubishi Kasei Kabushiki Kaisha was fed into a mold and the locked material was filled into the mold and then polyurethane was foamed at a temperature of 20° C. under normal pressure. The foam thus formed was heated at a temperature of 200° C. for 30 minutes to obtain a polyurethane cushion material having a cross sectional view as shown in FIG. 5. Polyurethane 1:locked material 2 was 7.2:1 (by weight).

EXAMPLE 2

A similar method as in Example 1 was carried out except that 200 denier of polyester filament was used instead of 300 denier of one to obtain a polyurethane cushion material having a cross sectional view as shown in FIG. 6. Polyurethane 1:locked material 2 was 3.8:1 (by weight).

EXAMPLE 3

A similar method as in Example 1 was carried out except that the locked material obtained in Example 1 was filled uniformly into a whole mold to obtain a polyurethane cushion material having a cross sectional view as shown in FIG. 7. Polyurethane 1:locked material 2 was 3.1:1 (by weight).

EXAMPLE 4

A similar method as in Example 1 was carried out except that a non-locked material which was prepared by using 200 denier of polyester filament without locking with the adhesive by a similar method as Example 1 was filled uniformly into a whole mold to a polyurethane cushion material having a cross sectional view shown in FIG. 7. Polyurethane 1:non-locked material 2 was 3:1 (by weight).

EXAMPLE 5

A non-locked material was formed by a similar method as in Example 1 except that the filament was not locked with the adhesive. The non-locked material was filled uniformly into a mold by a similar method as in Example 1 to obtain a polyurethane cushion material having a cross sectional view as shown in FIG. 7. Polyurethane 1:non-locked material 2 was 3:1 (by weight).

EXAMPLE 6

A similar method as in Example 1 was carried out except that the locked material obtained in Example 2 was filled into a whole mold to obtain a polyurethane cushion material having a cross sectional view as shown in FIG. 7. Polyurethane 1:locked material 2 was 3:1 (by weight).

CONTROL

A foamed polyurethane was obtained by using the same polyurethane as in Example 1.

TABLE 1

| EXAMPLE | Density ($\times 10^{-3}$) | I.L.D. 25% (kg) | I.L.D. 65% (kg) | Sag-factor | Repeated permanent compression strain(%) |
|---|---|---|---|---|---|
| 1 | 4.458 | 12.0 | 27.5 | 2.29 | max. 1 |
| 2 | 5.003 | 15.8 | 37.5 | 2.37 | max. 1 |
| 3 | 5.143 | 20.9 | 47.0 | 2.25 | max. 1 |
| 4 | 5.147 | 21.9 | 47.4 | 2.17 | max. 1 |
| 5 | 5.61 | 21.7 | 49.9 | 2.30 | max. 1 |
| 6 | 5.82 | 26.3 | 63.1 | 2.40 | max. 1 |
| CONTROL | 4.532 | 9.8 | 20.1 | 2.05 | max. 3 |

As being clear from TABLE 1, all of the specimens filled with the locked or non-locked material of polyester filament were considerably higher in I.L.D. than the conventional cushion material, and especially the specimens filled with the locked or non-locked material had more than two times of repulsive elasticity compared with the conventional one. Further, the sag-factor which shows a merit of rigidity is 10% or more bigger compared with the conventional one. Furthermore, repeated compression permanent strain was considerably improved compared with the conventional one.

What is claimed is:

1. A polyurethane cushion material comprising a foamed polyurethane having incorporated therein a mass of crimped polyester fiber filament of 50 to 1000 denier, in which said fiber filament has been twisted and then further twisted into a double crimped state, wet heat-set while in the double crimped state, and then opened up to form a three-oriented, crimped polyester fiber filament of 50 to 1000 denier and wherein said mass amounts to from 10 to 50 percent by weight in the polyurethane cushion material.

2. A cushion material according to claim 1, wherein the mass of fiber filament is a locked mass.

3. A cushion material according to claim 1, wherein the mass of fiber filament is a non-locked mass.

4. A cushion material according to claim 1, wherein the fiber filament is contained uniformly in a whole of the polyurethane cushion material.

5. A cushion material which comprises a layer of polyurethane cushion material according to claim 1, wherein said layer is bonded to a separate layer of fiber-free foamed polyurethane.

6. A cushion material according to claim 5, wherein said just named layer is bonded to a second separate layer of fiber-free foamed polyurethane.

* * * * *

UNITED STATES PATENT AND TRADEMARK OFFICE
CERTIFICATE OF CORRECTION

PATENT NO. : 4,269,889
DATED : May 26, 1981
INVENTOR(S) : Sakaaki Takagi

It is certified that error appears in the above—identified patent and that said Letters Patent is hereby corrected as shown below:

Col. 1, line 15; "sofaes" should read -- sofas --
Col. 1, line 64; "punch" should read -- punched --
Col. 6, line 27; "just" should read -- first -- Response and Amendment Dated May 15, 1979, page 2, claim 10.

Signed and Sealed this

Twenty-ninth Day of September 1981

[SEAL]

Attest:

GERALD J. MOSSINGHOFF

Attesting Officer

Commissioner of Patents and Trademarks